US010089406B2

United States Patent
Schneider et al.

(10) Patent No.: US 10,089,406 B2
(45) Date of Patent: Oct. 2, 2018

(54) GENERATING WEB PAGES WITH INTEGRATED CONTENT

(71) Applicant: Oracle International Corporation, Redwood Shores, CA (US)

(72) Inventors: David Schneider, Aurora, CO (US); Scott O'Bryan, Golden, CO (US); Michael Elges, Littleton, CO (US); Steven Bradley Likes, Parker, CO (US); Venkata Guddanti, Centennial, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 418 days.

(21) Appl. No.: 13/753,870

(22) Filed: Jan. 30, 2013

(65) Prior Publication Data

US 2014/0215307 A1 Jul. 31, 2014

(51) Int. Cl.
 *G06F 17/00* (2006.01)
 *G06F 17/30* (2006.01)

(52) U.S. Cl.
 CPC .............. *G06F 17/30893* (2013.01)

(58) Field of Classification Search
 CPC ................................ G06F 17/30873
 See application file for complete search history.

(56) References Cited

U.S. PATENT DOCUMENTS

| | | | |
|---|---|---|---|
| 6,731,314 B1 * | 5/2004 | Cheng ............... | G06F 17/30873 707/E17.111 |
| 7,013,289 B2 * | 3/2006 | Horn et al. ................. | 705/14.51 |
| 7,546,576 B2 * | 6/2009 | Egli ............................. | 717/106 |
| 7,769,825 B2 * | 8/2010 | Karakashian ........... | G06F 9/541 709/219 |
| 7,783,599 B2 | 8/2010 | Sullivan et al. | |
| 7,792,857 B1 * | 9/2010 | Brette et al. .................. | 707/771 |
| 2005/0039141 A1 * | 2/2005 | Burke .................. | G06F 3/0482 715/810 |
| 2007/0209005 A1 * | 9/2007 | Shaver ................ | G06F 17/3089 715/733 |
| 2009/0183072 A1 | 7/2009 | Stephenson et al. | |
| 2009/0228775 A1 * | 9/2009 | Sullivan et al. .............. | 715/205 |
| 2009/0271690 A1 * | 10/2009 | Iglesias ........................ | 715/200 |
| 2011/0179370 A1 * | 7/2011 | Cardno et al. ................ | 715/771 |
| 2011/0213655 A1 * | 9/2011 | Henkin .................. | G06Q 30/00 705/14.49 |

(Continued)

*Primary Examiner* — Scott Baderman
*Assistant Examiner* — Barbara Level
(74) *Attorney, Agent, or Firm* — Potomac Law Group, PLLC (57) ABSTRACT

A system for generating a web page that integrates content from different content sources. The system defines a request configured to be transmitted from a consumer application to a producer application. The request is for the producer application to provide content to the consumer application. The system adds additional custom data to the request via a plurality of integration points. The additional custom data is configured to be interpreted by handlers corresponding to the integration points. The system receives content produced by the producer application. The producer application produces the content based upon the request and the additional custom data. The system displays the received content to appear as an integrated whole with other content on a page.

19 Claims, 11 Drawing Sheets

(56) References Cited

U.S. PATENT DOCUMENTS

2011/0246880 A1* 10/2011 Horton ................ G06F 9/4446
  715/708
2013/0246266 A1* 9/2013 Coleman ............ G06Q 30/0641
  705/44

* cited by examiner

Test Project

Local Header 1
Local SubHeader 1

This is a bit of local content

Local Header 2
△ Remote SubHeader 2

This is a popup. It is a test to show how popups look in a portlet environment.

[ OK ] [ Cancel ]

This is remote content.

When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation.

We hold these truths to be self-evident, that all men are created equal, that they are endowed by their Creator with certain unalienable Rights, that among these are Life, Liberty and the pursuit of Happiness.

That to secure these rights, Governments are instituted among Men, deriving their just powers from the consent of the governed. That whenever any Form of Government becomes destructive of these ends, it is the Right of the People to alter or to abolish it, and to institute new Government, laying its foundation on such principles and organizing its powers in such form, as to them shall seem most likely to effect their Safety and Happiness. Prudence, indeed, will dictate that Governments long established should not be changed for light and transient causes; and accordingly all experience hath shown, that mankind are more disposed to suffer, while evils are sufferable, than to right themselves by abolishing the forms to which they are accustomed. But when a long train of abuses and usurpations, pursuing invariably the same Object evinces a design to reduce them under absolute Despotism, it is their right, it is their duty, to throw off such Government, and to provide new Guards for their future security.

[ Click me ]

Local Header 3
Local SubHeader 3

This is a bit of local content

GENERATING WEB PAGES WITH INTEGRATED CONTENT

FIELD

One embodiment is directed generally to a computer system, and in particular to a computer system that generates a web page that integrates content from different sources.

BACKGROUND INFORMATION

A development framework may be considered as a software framework used to implement a standard structure of an application, for a specific development environment. In using a standard structure for applications, a development framework may allow the underlying code structure of different applications to be predefined.

Web applications may be developed by using a development framework. Web applications may be used to bring information together from different sources in an integrated and unified way. For example, content from different sources may be embedded and displayed by a single web page generated by a web application. The single web page may provide different dedicated areas for displaying the content from each of the sources. These dedicated areas may be generally referred to as "portlets."

SUMMARY

One embodiment is a system for generating a web page that integrates content from different sources. The system defines a request configured to be transmitted from a consumer application to a producer application. The request is for the producer application to provide content to the consumer application. The system adds additional custom data to the request via a plurality of integration points. The additional custom data is configured to be interpreted by handlers corresponding to the integration points. The system receives content produced by the producer application. The producer application produces the content based upon the request and the additional custom data. The system displays the received content to appear as an integrated whole with other content on a page.

BRIEF DESCRIPTION OF THE DRAWINGS

FIG. 9 is a screen shot of an interface that shows content from different sources that is embedded and displayed within a page in accordance with another embodiment.

DETAILED DESCRIPTION

One embodiment is a method of embedding and displaying content received from a first application. A second application displays the content received from the first application within a region of a displayed page. The first application produces the content that is received by the second application. As such, the first application may be generally referred to as a "producer application." The second application, which receives the produced content from the producer application, may be generally referred to as a "consumer application." The producer application may be remote from the consumer application. As such, one embodiment is a method of embedding content from a remote producer application into a region of a page displayed by a consumer application.

In one embodiment, the consumer application is a web application. The consumer web application can embed content from a remote producer application into a region of a displayed webpage. The previous approaches for embedding content from one or more producer applications into a web page would use technologies relating to portlets. Portlets are typically software components that are managed and displayed in a portal page. A portal page displays different portlets, and each portlet is displayed within a portlet window. Different portlet windows within a portal page typically do not overlap with each other. Although portlets may be useful in displaying different types of content on a single page, technologies utilizing portlets are difficult to use, error-prone, and do not provide proper integration of page content. Specifically, the content displayed by portlets does not appear as an integrated whole. A viewer may readily ascertain that different portlets retrieve content from different sources, as described in more detail below.

One specific shortcoming of using technologies relating to portlets is that these previous approaches are generally not suitable for running certain work flows within a portal page. A work flow may generally be understood as a set of steps and logic that control an order in which pages are displayed and how information is passed between a producer application and a displayed portal page. A work flow may be directed to integrating content from different content sources, as described above. One example of a type of work flow is an Advanced Development Framework ("ADF") task flow.

Known portlet technologies are not well-suited to run certain work flows (e.g., ADF task flows) because the portlet technologies are generally designed to accomplish a different purpose. Specifically, portlet technologies are generally designed to accept content from different sources (e.g., .NET sources and JAVA sources) and aggregate this content within portlets of a single portal page. However, in aggregating the content from the different sources, the different portlets that display the different content generally know nothing about each other. Thus, the content within each portlet is generally presented without regard to the content within surrounding portlets. The use of portlet technologies typically operates under the assumption that the different sources provide their content independent from one another with minimal interaction between them.

Compared to the functioning of portlets as described above, displaying content from different sources using certain work flows, such as ADF task flows, generally utilizes more integration between the different sources of content. When displaying content using an ADF task flow, content may be displayed to the user using JavaServer Faces ("JSF"). When displaying content by a consumer application via ADF task flows, the different sources of content should interactively respond to contextual events sent by the consumer application as well as JSF events which occur. These contextual events may allow a portion of content to understand the context in which it is to be presented by the consumer application. JSF events may be events that also affect how content should be presented by the consumer application. The previous known approaches of using portlets to display content are sometimes unable to reliably propagate JSF events from content sources to the corresponding portal page displayed by a consumer application.

One embodiment of the present invention provides a method of processing remote work flows to embed and display content from a remote producer application in a page displayed by a consumer application, where the content from the remote producer application interacts with and/or is based upon data transmitted from the consumer side. In one embodiment, the method is directed to ADF-specific technology. In another embodiment, embedding content received from the producer application includes embedding content received from the producer application into a consumer application page via a standard Hypertext Transfer Protocol ("HTTP") interface.

Embodiments of the present invention may enable communication between producer and consumer applications using a standard HTTP protocol. Specifically, requests for content that are transmitted to the producer application (from the consumer side) may be transmitted using the HTTP protocol. One embodiment also enables automatic propagation of user identity from consumer to producer application.

By having different producer applications interactively respond to contextual events sent by a consumer application, embodiments of the present invention may also enable consistent application of stylesheet and skins across content from both consumer and producer applications. Embodiments of the present invention may simplify development of web applications that display content from multiple producer applications on one page of a consumer application, while also creating a uniform and consistent user experience.

Figure 1:
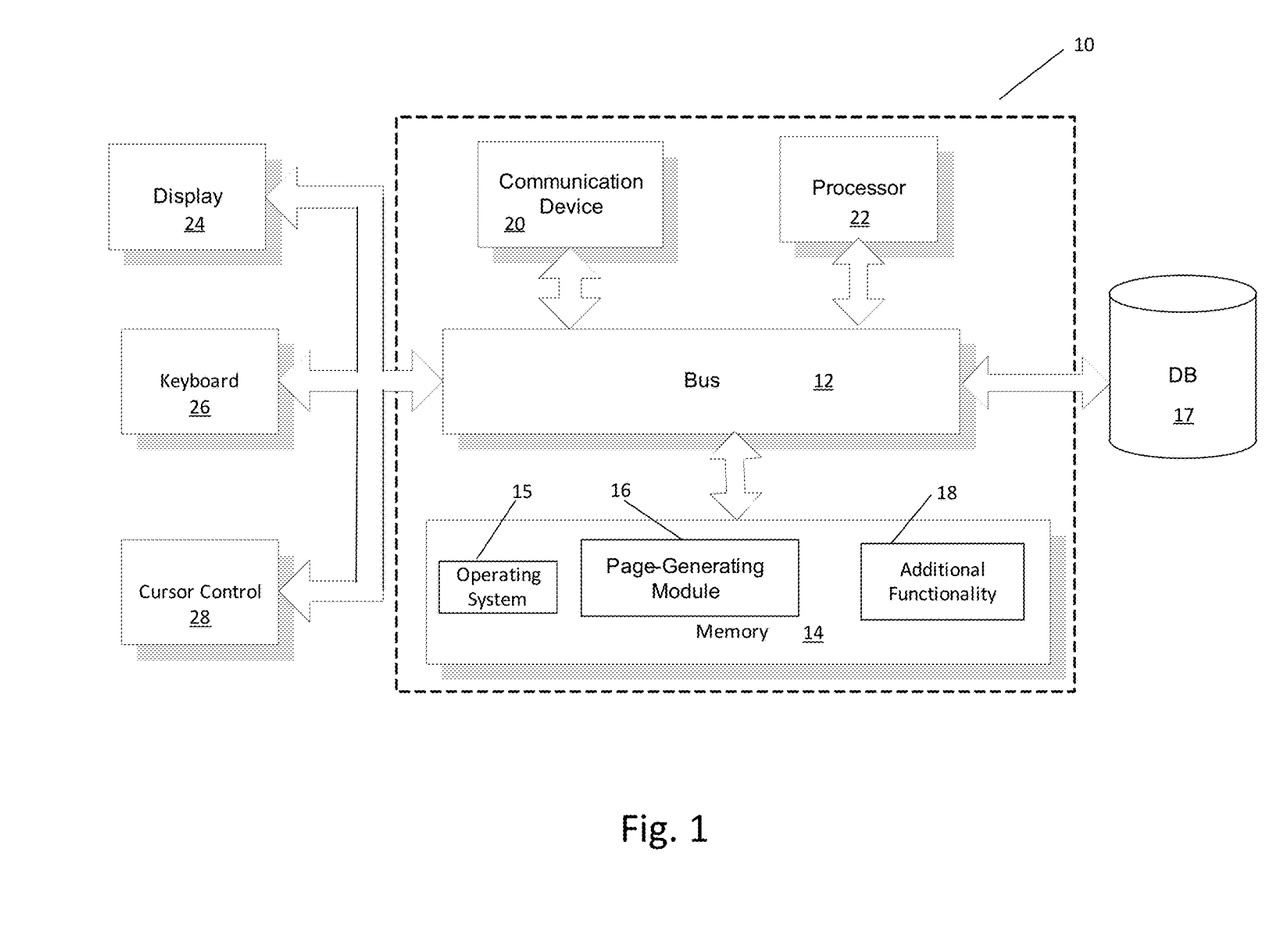
FIG. 1 is an overview block diagram of a computer system that generates a web page that integrates content from different sources in accordance with an embodiment of the present invention.

FIG. 1 is an overview block diagram of a computer system 10 that generates a web page that integrates content from different sources in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules include an operating system 15 that provides operating system functionality for system 10. The modules further include page-generating module 16 for generating a web page that integrates content from different sources, as disclosed in more detail below. System 10 can be part of a larger system such as an overall development environment. Therefore, system 10 will typically include one or more additional functional modules 18 to include additional functionality, such as data processing functionality for receiving and storing work flows, or additional software development functionality such as "JDeveloper" from Oracle Corp. A database 17 is coupled to bus 12 to store data used with modules 16 and 18.

Figure 2:
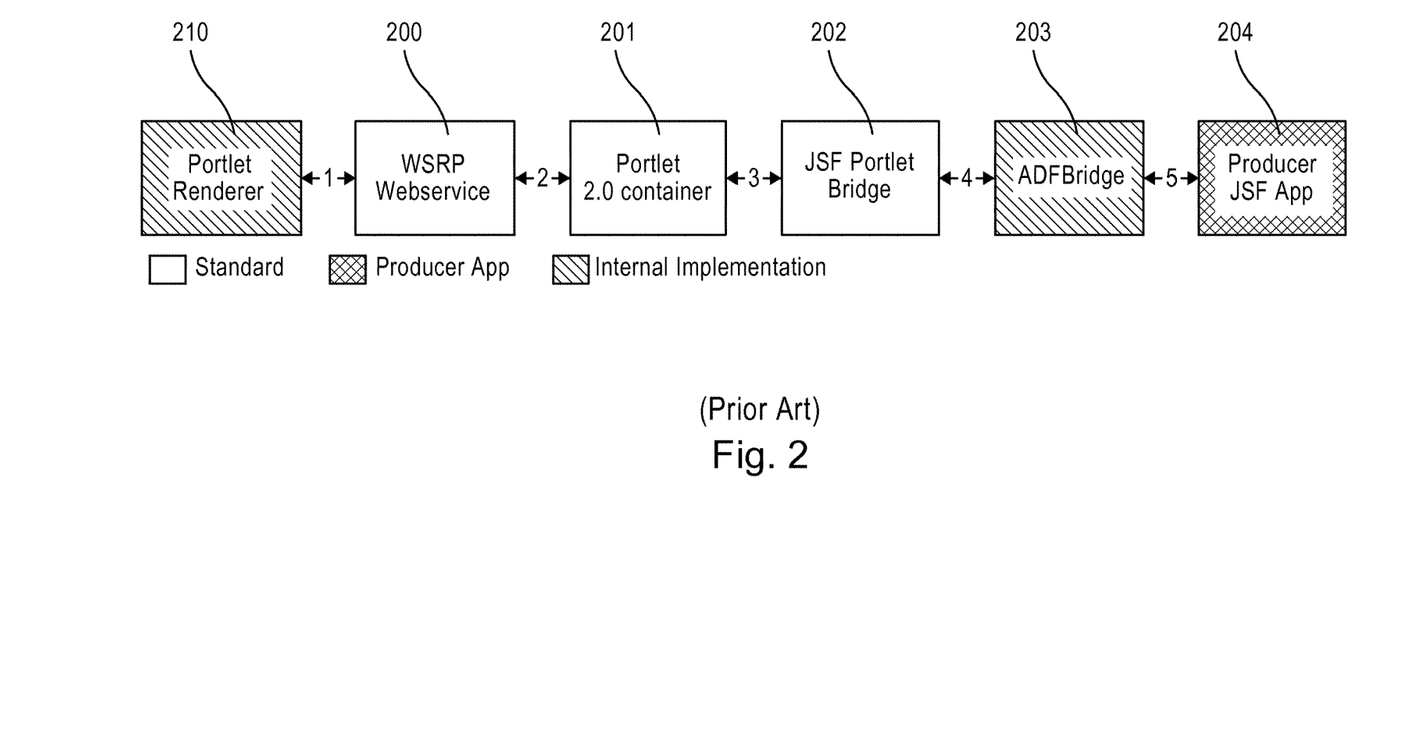
FIG. 2 illustrates a development framework in accordance with the prior art.

FIG. 2 illustrates a development framework in accordance with the prior art. Prior art development framework that utilizes portlet technology may include subsystems corresponding to a Portlet Renderer 210, a Web-Services-for-Remote-Portlets ("WSRP") Webservice 200, a Portlet container 201, a JSF Portlet Bridge 202, an ADF Bridge 203, and a Producer JSF Application 204. Portlet Renderer 210 may be a subsystem of the framework that exists on the side of a consumer application. Portlet Renderer 210 may be the subsystem that is responsible for receiving content from a remote producer application, embedding the content, and displaying the content on at least one page. Portlet Renderer 210 may also be internally implemented by a development team to work with industry-standard subsystems of the development framework. Producer JSF Application 204 may be a subsystem of the producer application that provides remote content to the consumer application (e.g., the consumer application of Portlet Renderer 210). WSRP Webservice 200, Portlet container 201, and JSF Portlet Bridge 202 of the prior art development framework of FIG. 2 may be industry-standard subsystems of the development framework. Modifying these industry-standard subsystems (200, 201, 202) can be difficult for a user because these industry-standard subsystems are intended to accomplish a prespecified purpose (e.g., integrating content from .NET and Java sources), and these industry-standard subsystems are not readily modified to accomplish other purposes. Further, users may have difficulty transmitting data (e.g., transmitting custom/contextual data) from the consumer-side (e.g., from Portlet Renderer 210) to the producer application (e.g., Producer JSF App 204) through the industry-standard subsystems. For example, if a user wishes to send contextual information from the consumer side to the producer application so that the producer application is able to handle contextual events more effectively, the user may have difficulty sending the contextual information through the industry-standard subsystems (200, 201, 202).

One of the reasons why it may be difficult for a user to send data from the consumer side to the producer application (through the industry-standard subsystems) is because the set of industry-standard subsystems (200, 201, 202) generally have only one point of integration. In other words, data to be transmitted to the producer application from the consumer side can generally only be transmitted via one channel/integration point. Specifically, in the prior art example of FIG. 2, the single integration point exists between Portlet Renderer 210 and WSRP Webservice 200. The single integration point between Portlet Renderer 210 and WSRP Webservice 200 may only allow the transmission of a pre-specified type of data, and may prevent the transmission of additional custom/contextual data to be sent from the consumer side to the producer application. Custom data may be generally understood as data that is separate from the data typically transmitted through industry-standard subsystems of a development framework.

Figure 3:
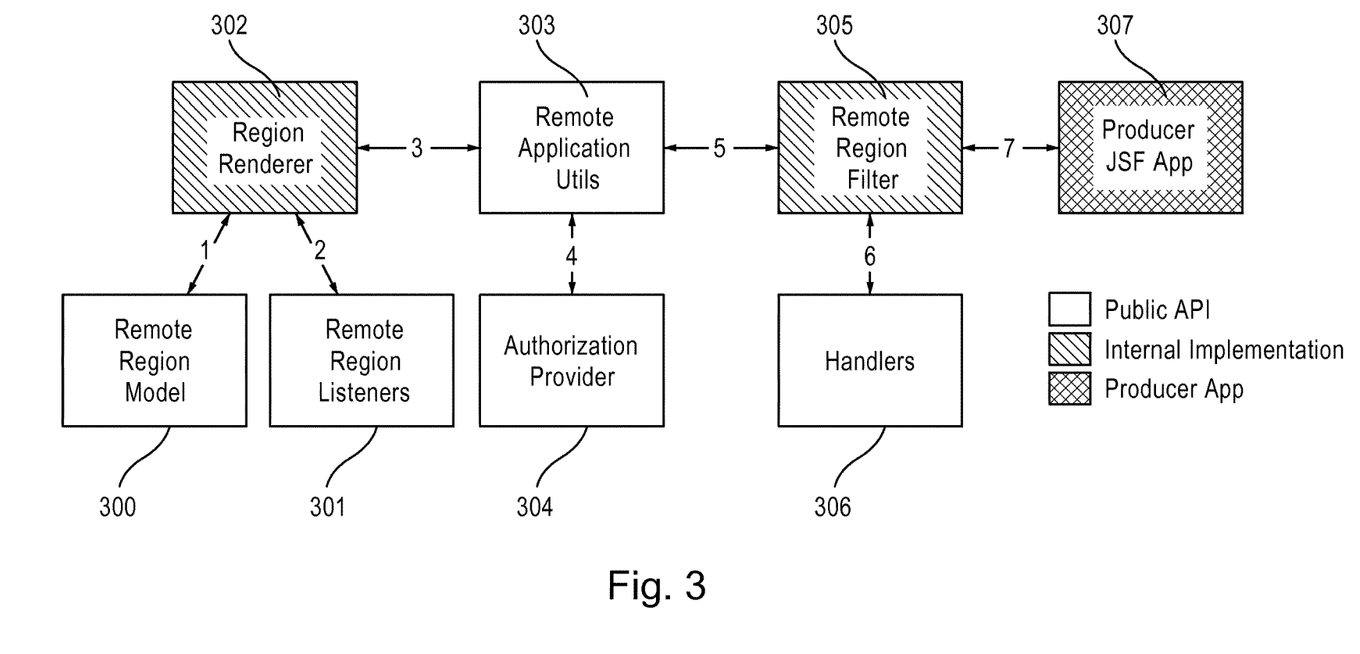
FIG. 3 illustrates a development framework in accordance with one embodiment.

FIG. 3 illustrates a development framework in accordance with one embodiment. In contrast to the prior art, one embodiment allows a user to have substantially more control regarding the type of data (e.g., custom/contextual data) that is exchanged from consumer application to producer application. This functionality may be achieved by providing a series of application programming interfaces ("APIs") that can allow subsystems (e.g., ADF-subsystems) to interact with the request and the response of a remote work flow from the consumer application to the producer application. One embodiment allows for custom data, such as a contextual event, to be sent from one producer application to invoke a contextual event on another producer application. As such, the content received from both producer applications by a consumer application could be updated during a single request from the consumer application.

Referring to FIG. 3, the development framework in accordance with one embodiment may include subsystems corresponding to a Remote Region Model 300, a Remote Region Listener 301, a Region Renderer 302, a Remote Application Utils 303, an Authorization Provider 304, a Remote Region Filter 305, Handlers 306, and a Producer JSF App 307. One embodiment includes a plurality of integration points through which data can be sent from the consumer side (e.g., the side of Region Renderer 302) to a remote producer application (e.g., Producer JSF App 307). In the example of FIG. 3, Remote Region Model 300 and Remote Region Listeners 301 act as two points of integration through which data can be sent from the consumer side to Producer JSF App 307. In addition to allowing a consumer application to send data to the producer application, Remote Region Model 300 and Remote Region Listener 301 allow other pieces of a technology stack ("tech stack") on the consumer side to add data (e.g., custom/contextual data) to a request to the producer application. The request may correspond to a request to process a remote work flow. A "tech stack" may be generally understood as a layer of components that are used to provide a software solution or application. For example, data added by a tech stack to a request for transmission to the producer application may eventually allow rendering of data in a more integrated fashion by Region Renderer 302, as described in more detail below. In one embodiment, a producer application may send metadata to the consumer application to facilitate the exchange of consumer stylesheets between the producer application and the consumer application. As such, stylesheet configuration between the producer and the consumer may be more easily configured.

In other words, Remote Region Model 300 and Remote Region Listener 301 act as extension points that allow other portions of the tech stack to participate in the communication between a consumer application (e.g., Region Renderer 302) and a producer application (e.g., Producer JSF App 307). Through these extension points, other portions of the tech stack may send custom data to the producer application. Remote Region Listener 301 may give ADF subsystems which are not directly involved with Remote Region Model 300 a chance to interact with the remote producer application. Both Remote Region Model 300 and Remote Region Listeners 301 may have the ability to add data to a request from the consumer-side to the producer application. This added data (e.g., custom/contextual data) may invoke custom logic on the producer application as well as receive a response resulting from that custom logic.

As described above, one function of Region Renderer 302 is to execute a work flow transmitted from the consumer side and to retrieve content from a producer application based upon the transmitted work flow. Region Renderer 302 initiates a remote connection between the consumer side and the producer application and allows execution of code both before and after the request for content from the producer application. As described above, Region Renderer 302 also provides a listener interface which can allow third-party plugins to be notified of a call to the producer application. As such, in one embodiment, ADF subsystems which are not directly involved in Remote Region Model 300 may add their own task invocations via Remote Region Listeners 301. Task invocations include addition of custom data and allow execution of custom code on the producer application which can be used to set up an environment before the remote work flow is run (e.g., like appending request attributes) and also allow a response from the producer application to be returned to the consumer application.

Remote Application Utils 303 is a subsystem of the development framework that makes a call into a remote server that runs producer application 307. Remote Application Utils 303 subsystem ensures that communication with producer application 307 is performed using a correct protocol. Remote Application Utils 303 also manages the requests to and responses from the producer application 307. Remote Application Utils 303 also executes a special filter on the producer-side which is responsible for setting up the environment and executing the tasks necessary to run a remote producer application 307. Remote Application Utils 303 subsystem also communicates with a pluggable authorization subsystem as well as any other subsystem for any extra security which may be needed.

As an example of communicating with a pluggable authorization subsystem, Remote Application Utils 303 may communicate with an Authorization Provider 304 subsystem to confirm that Remote Application Utils 303 has proper authorization to call upon the producer application 307. The data from the consumer side may then be transmitted from Remote Application Utils 303 to Remote Region Filter 305. Remote Region Filter 305 may then invoke handlers 306 to interpret the data added by Remote Region Listener 301 and Remote Region Model 300.

Handlers 306 provide the APIs for interacting with, and calling into remote producer application 307. These APIs include representations of requests to remote producer application 307, representations of responses from remote producer application 307, constructs for various types of responses, objects which are to contain server information, and contracts for various handlers that the ADF subsystems can invoke on a remote server of remote producer application 307. The provided APIs may be used for making actual requests to the remote server and/or invoking logic on the remote server.

By using the development framework of FIG. 3, embodiments of the present invention may allow various portions of a tech stack to transmit custom/contextual data from the consumer side to the producer application. The development framework of the present invention allows a consumer-side application to run application-specific logic on the producer side and retrieve corresponding content from the producer application. This capability is not available when using the prior art development framework that uses the industry-standard subsystems, as shown in FIG. 2.

Figure 4:
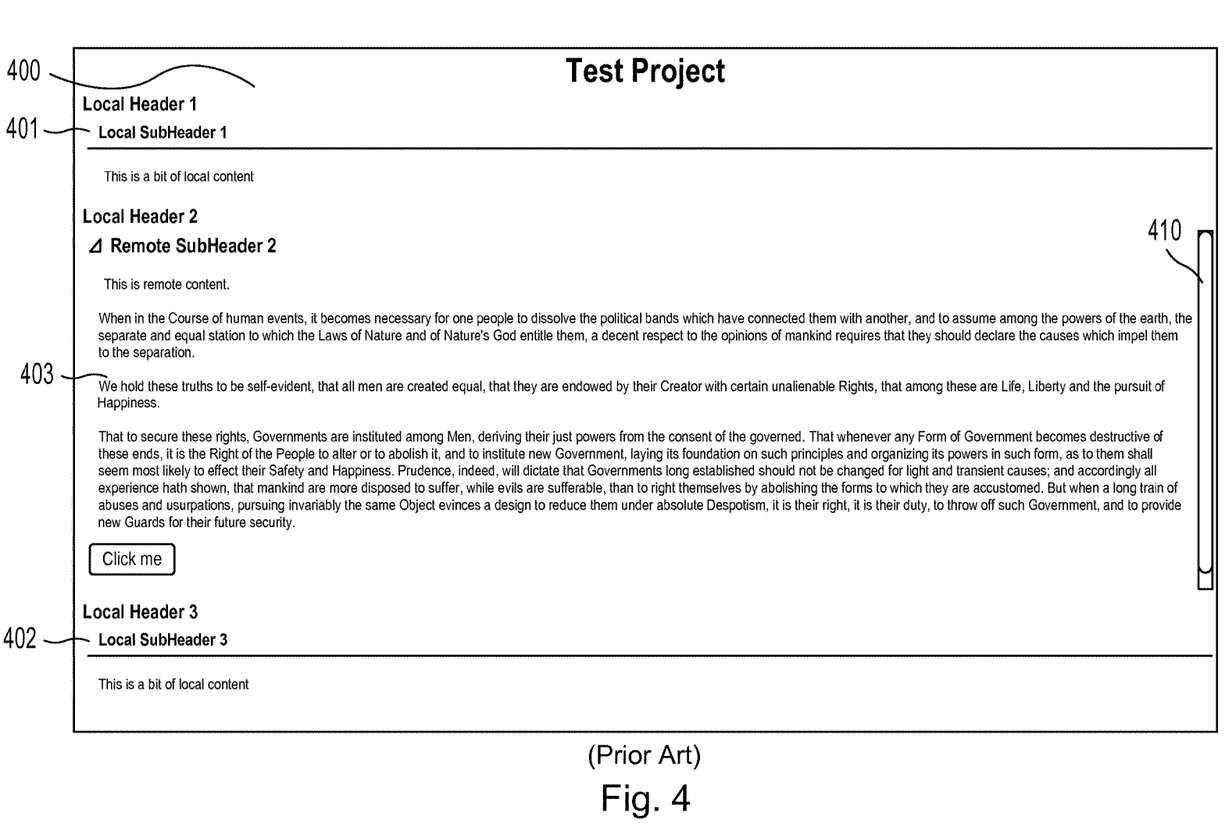
FIG. 4 is a screen shot of an interface showing content from different sources that is embedded and displayed within a page according to the prior art approach.

FIG. 4 is a screen shot of an interface 400 showing content from different sources (401, 402, and 403) that is embedded and displayed within a page according to the prior art approach. The content of interface 400 may be embedded and displayed within a page according to the previous development framework of FIG. 2, for example. Interface 400 may be displayed by Portlet Renderer 210 of FIG. 2. Interface 400 of FIG. 4 shows the embedding and displaying of content from different sources using portlets. For example, interface 400 embeds and displays local content (401, 402) as well as remote content 403. Local content may be generally understood as content that is retrieved from the same system (e.g., a same server) that contains the consumer application). As described above, when using portlets to display content from different producer applications within a consumer application page, content from the different producer applications are displayed largely independent/isolated from each other. In other words, although the content from the different sources appear within the same main page as displayed by the consumer application, in actuality, the different pieces of content may be completely isolated from one another. As a result of the different pieces of content being isolated from each other, the prior art approaches have certain short-comings, as described in more detail below.

For example, consider a consumer application page 400 that displays local content (401, 402) from a local source as well as remote content 403 from a remote producer application. Remote content 403 may include an accompanying scroll bar 410. Scroll bar 410 may be undesirable because the scroll bar may clearly reveal to a viewer that remote content 403 is from a different source than local content (401, 402). As such, the overall page shown by interface 400 may not appear as an integrated whole to the viewer. Although this accompanying scroll bar 410 may not always appear when using the previous approaches, there is generally no way to always prevent scrollbar 410 from appearing when using the previous approaches. There is generally no way to always prevent scrollbar 410 from appearing in all cases because remote content 403 corresponding to the scrollbar 410 (i.e., the content within "Local Header 2") is actually an isolated container on the page. Although certain techniques may be used to resize this isolated container, these techniques sometimes fail and have different effects depending upon the browser used to view the consumer application page shown by interface 400.

Figure 5:
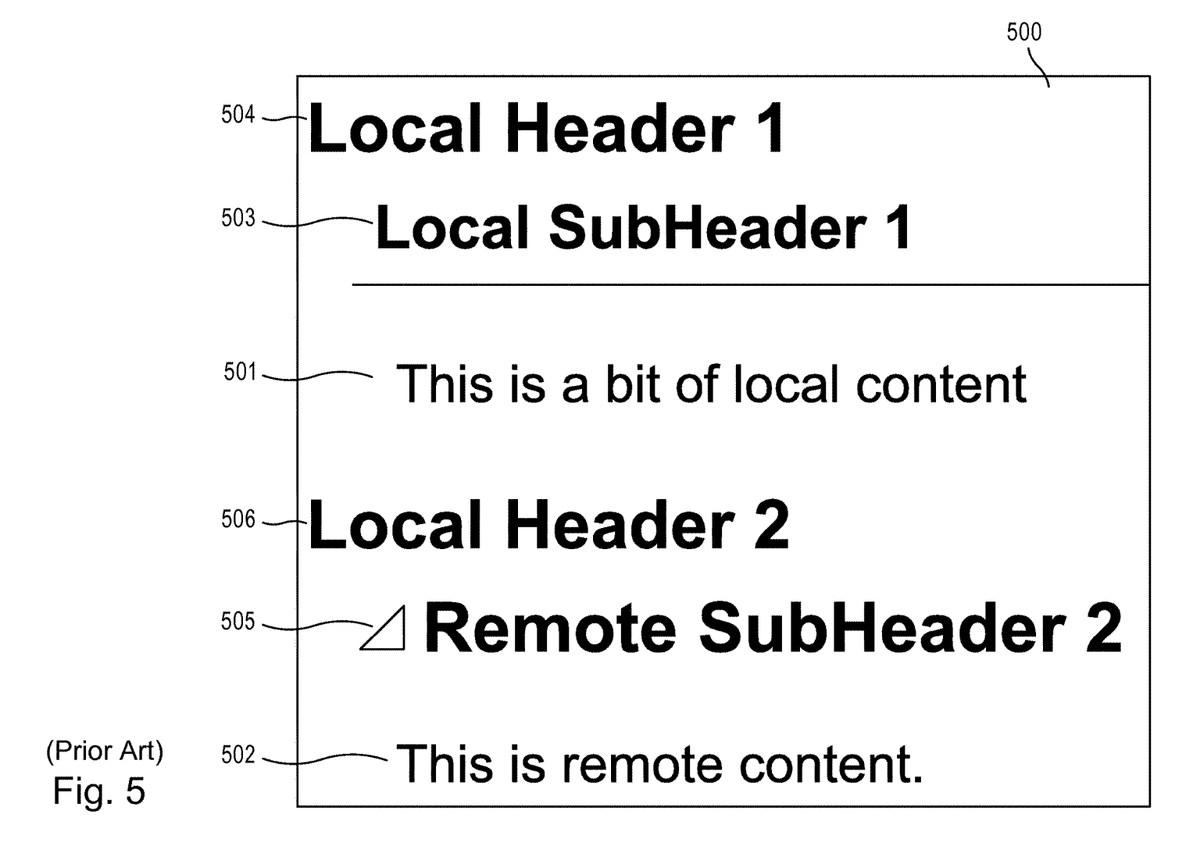
FIG. 5 is a screen shot of an interface showing content from different sources that is embedded and displayed within a page according to another prior art approach.

FIG. 5 is a screen shot of an interface 500 showing content from different sources (501, 502) that is embedded and displayed within a page according to another prior art approach. Like interface 400 show above, interface 500 may also be displayed by Portlet Renderer 210 of FIG. 2. As another example of a short-coming of the previous approaches, content from different producer applications may be displayed differently from each other. For example, FIG. 5 shows a set of subheaders that are contained inside of a main header. For the local content 501, the text "Local Subheader 1" 503 appears in a smaller font and with different styling than its corresponding parent header "Local Header 1" 504. On the other-hand, for the remote content, the text "Remote Subheader 2" 505 appears as the same size and in the same style as its corresponding parent header "Local Header 2" 506. This is one example of how a portlet may render content differently among different sources of content. Information in a portlet is largely independent/unaware of its container because the remote content from the producer application is isolated from the consumer application page which contains the remote content.

Figure 6:
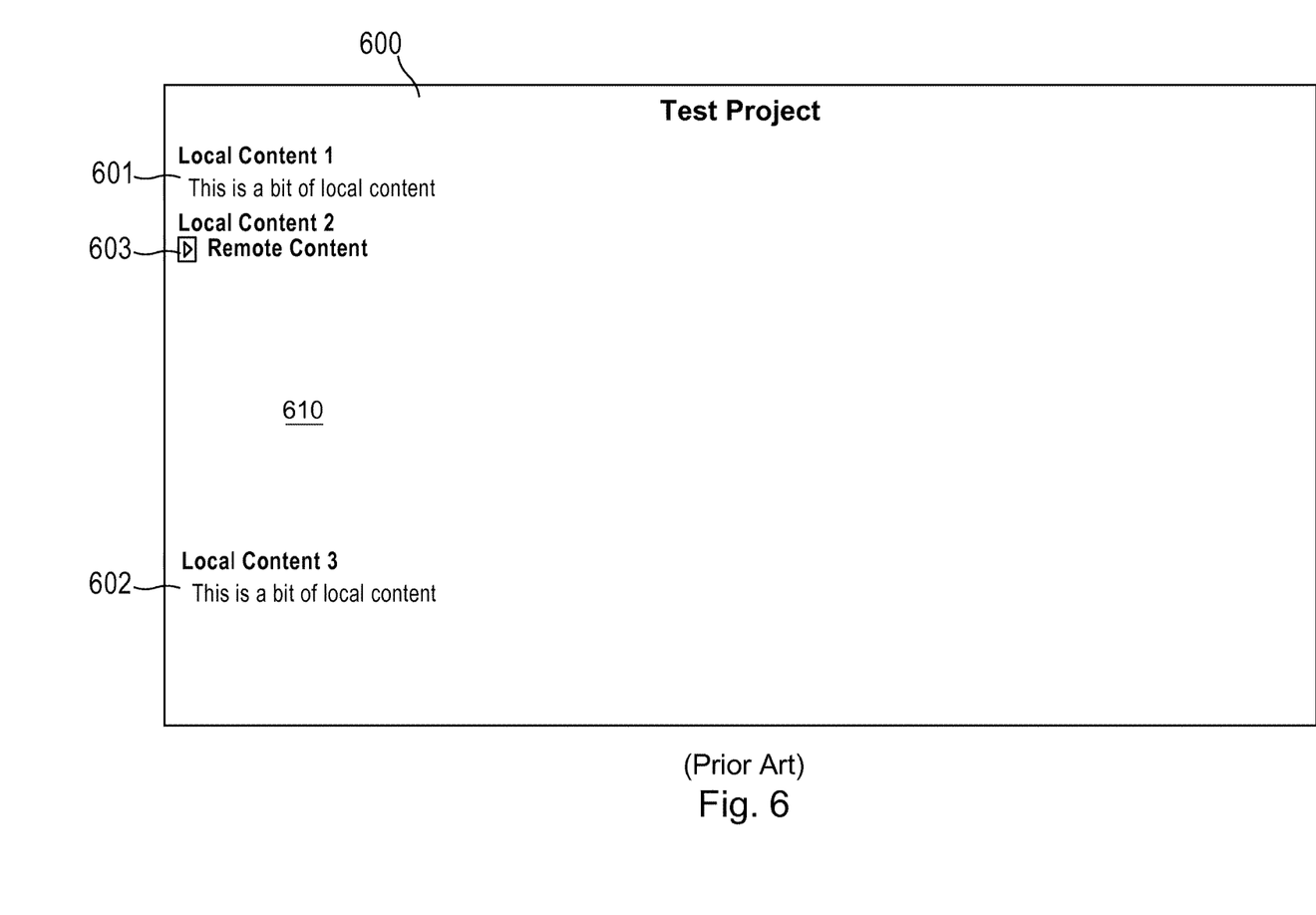
FIG. 6 is a screen shot of an interface showing content from different sources that is embedded and displayed within a page according to another prior art approach.

FIG. 6 is a screen shot of an interface 600 showing content from different sources (601, 602, and 603) that is embedded and displayed within a page according to another prior art approach. Like interfaces 400 and 500 show above, interface 600 may also be displayed by Portlet Renderer 210 of FIG. 2. When using the previous approaches, a frame that is used to isolate one piece of content from another piece of content may not be resized properly. For example, a container of remote content 603 may not be resized properly in accordance with the contained remote content and, as such, the container may show space 610 or scrollbars when content inside of the container is resized.

Figure 7:
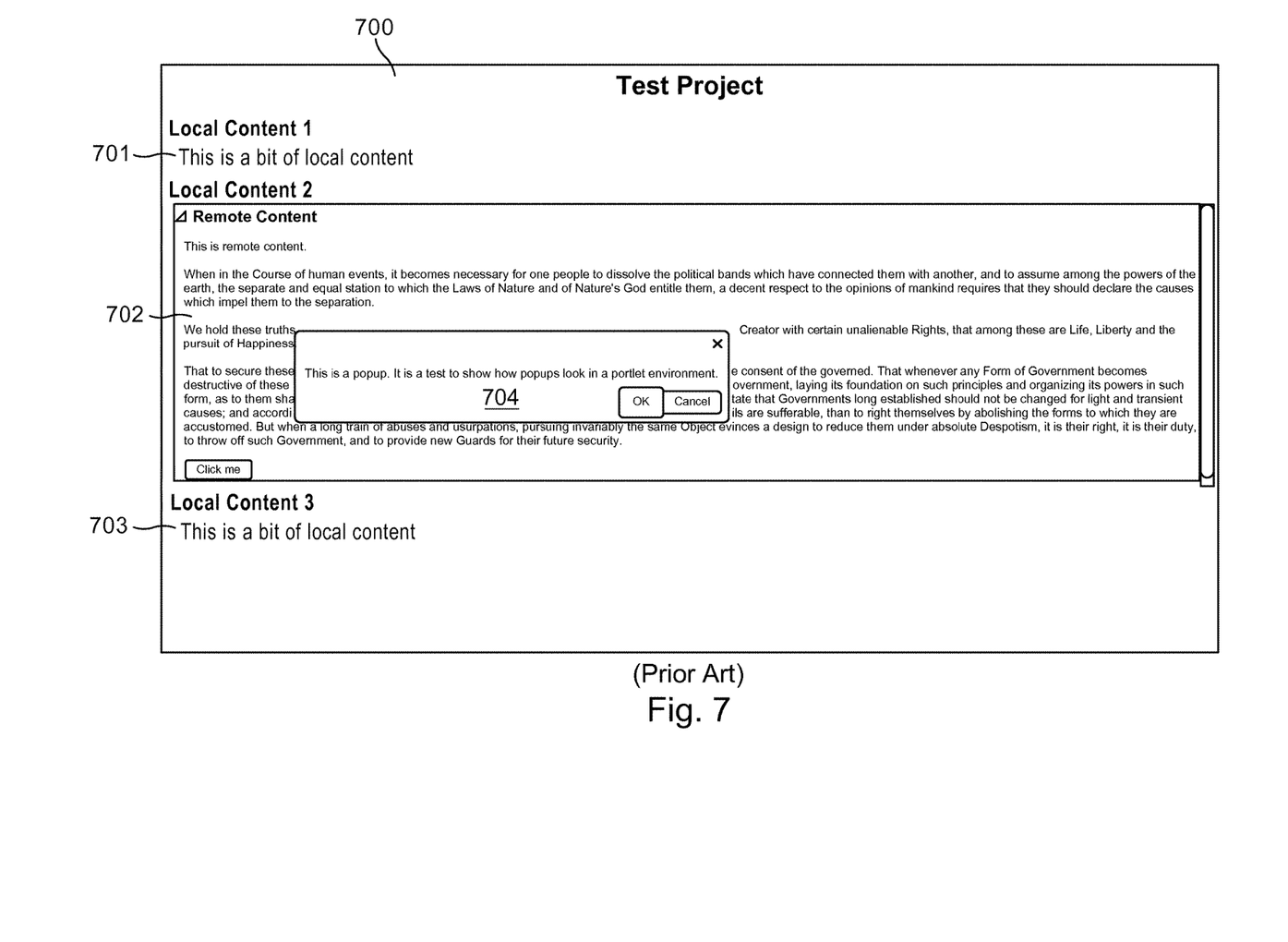
FIG. 7 is a screen shot of an interface showing content from different sources that is embedded and displayed within a page according to another prior art approach.

FIG. 7 is a screen shot of an interface 500 showing content from different sources (701, 702, and 703) that is embedded and displayed within a page according to another prior art approach. When using the previous approaches, popups 704 may also be problematic because the popups should be able to dim substantially all the content beneath them. The popup 704 should also be draggable over the entire area of the screen. However, in using the previous portlet technologies, the popups only "mask" a relevant portion of the content (e.g., the remote content 702) and the popup 704 may only be dragged within the contained gray area.

Figure 8:
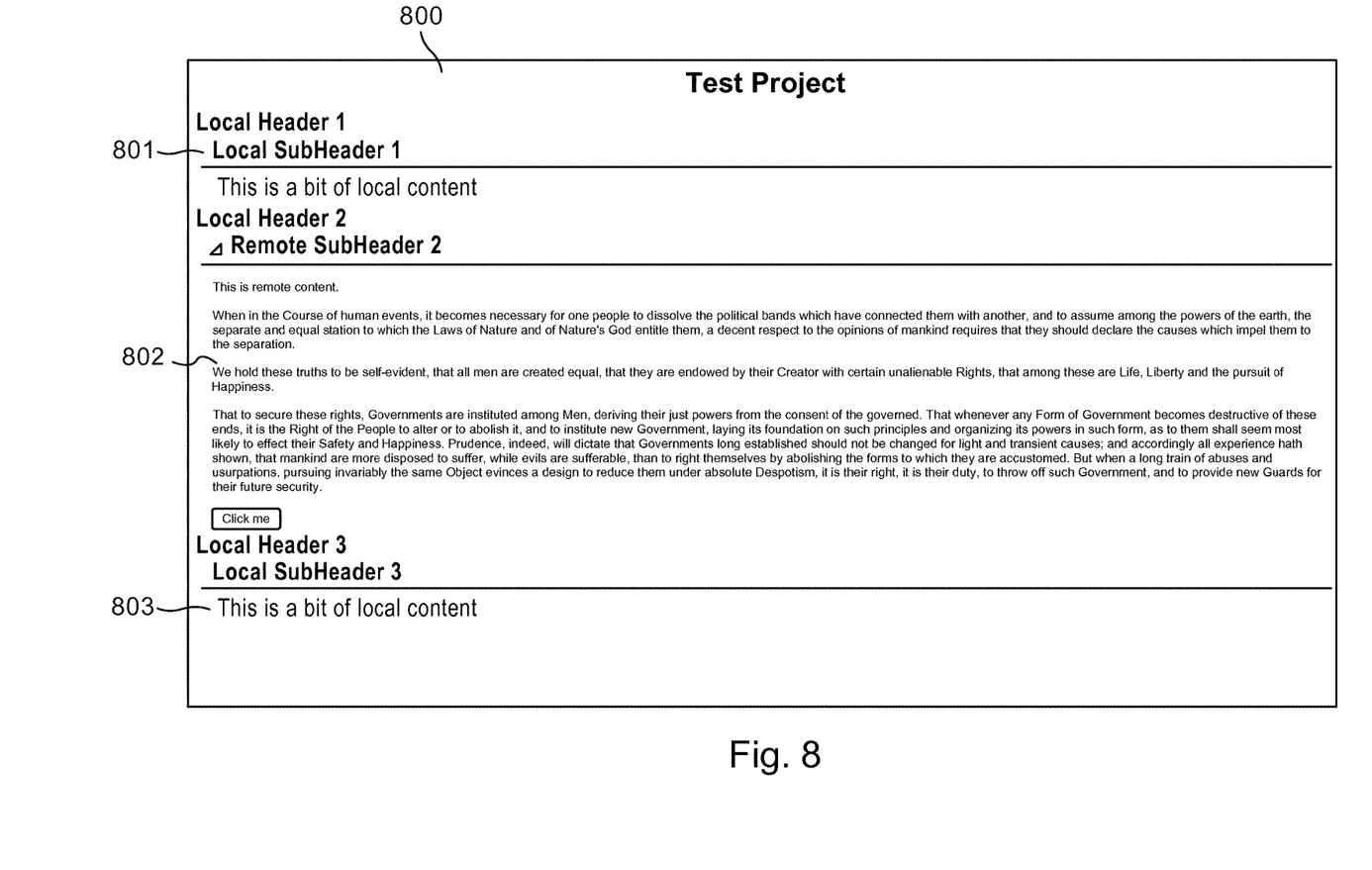
FIG. 8 is a screen shot of an interface that shows content from different sources that is embedded and displayed within a page in accordance with one embodiment of the present invention.

In contrast to the prior art approaches, embodiments of the present invention allow content from different sources to be embedded and displayed in an integrated manner. FIG. 8 is a screen shot of an interface 800 that shows content from different sources (801, 802, 803) that is embedded and displayed within a page in accordance with one embodiment of the present invention. For example, in this embodiment, there are no frames separating the different content. Specifically, there are no frames isolating the remote content from the local content. As such, a viewer may not notice any separation between different types of content displayed on a page of the consumer application, and the content (801, 802, 803) of the page may appear to be fully integrated.

Referring again to FIG. 8, one embodiment displays content without displaying scrollbars (scrollbars whose display may result in an un-integrated appearance). Furthermore, one embodiment displays content using consistent sizing and styling. For example, the content within "Remote Subheader 2" is displayed using sizing and styling consistent with the other content on the page.

FIG. 9 is a screen shot of an interface showing content from different sources that is embedded and displayed within a page in accordance with another embodiment. In contrast to the prior art approaches, in one embodiment of the present invention, when popups occur, the popups black out the entire screen 910 and can be moved anywhere on the screen rather than being limited to being dragged within a region that contains remote content.

As described above, one embodiment is directed to a development framework that embeds and displays content from different sources in a unified/integrated way. For example, one embodiment is a development framework that embeds and displays remote ADF-faces content in an ADF-faces page. ADF-faces may generally be understood as a set of user-interface components. These user-interface components may be built on top of JSF APIs. One embodiment is directed to a framework for an ADF development environment and may simplify the setup and use of remote content, as compared to the setup and use of remote content via WSRP enabled portlets.

As described above, one embodiment displays remote content through JSF within a work flow. For example, one embodiment displays remote content though JSF within an ADF Task Flow. Displaying remote content through JSF within an ADF task flow may utilize interactivity such as the ability to respond to contextual events as well as standard JSF events. Running ADF task flows using the development frameworks provided by the prior art approaches may require extensive configuration by the user. Furthermore, when using the prior art approaches, there are instances when contextual events and standard JSF events may not be properly communicated to the remote producer application.

One embodiment of the present invention is directed at embedding and displaying content while allowing for greater interaction between the different portions of produced content. One embodiment replaces the previously known approaches with an ADF-specific technology designed to allow remote JSF content to be displayed in a JSF Page.

As previously described, in one embodiment, content corresponding to ADF Taskflows may be expected to interact with other content and to be integrated with the other content. Additionally, the ADF content may also respond to contextual events. For such functionality to be achieved, a consumer application may send additional metadata to a producer application and vice versa, which may be difficult to achieve using the previous approaches.

Figure 10:
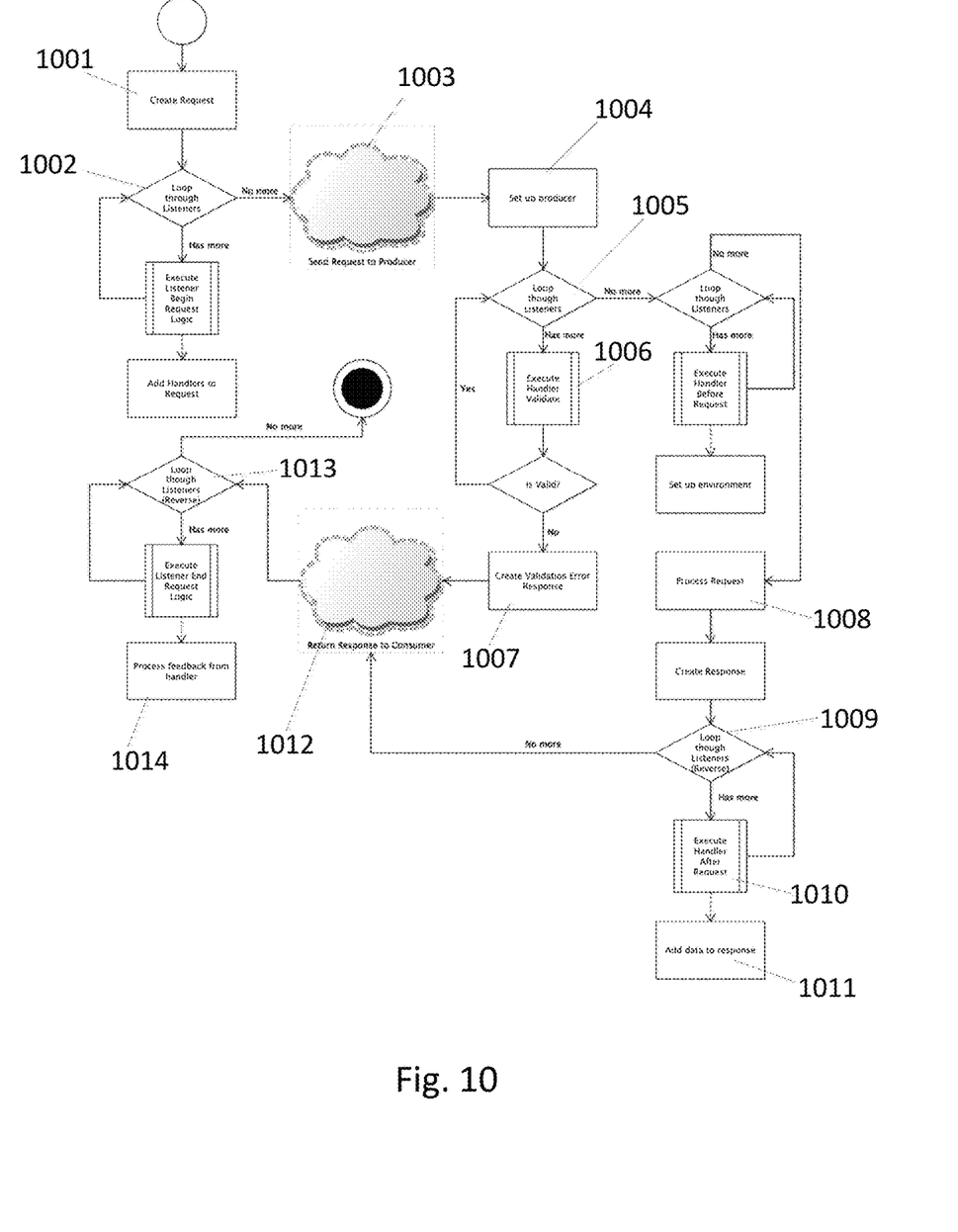
FIG. 10 is a flow diagram of the functionality of the page-generating module of FIG. 1 in accordance with one embodiment.

FIG. 10 is a flow diagram of the functionality of the page-generating module 16 of FIG. 1 in accordance with one embodiment. In one embodiment, the functionality of the flow diagram of FIG. 10 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA")), or any combination of hardware and software.

At 1001, a request for content is created by a consumer application (e.g., a consumer application of Region Renderer 302 of FIG. 3). In one embodiment, the request corresponds to a remote work flow. At 1002, the listeners (e.g., Remote Region Listener 301 of FIG. 3) that are configured to add custom/contextual data to the request are looped through. For each listener that has data to add to the request, a handler is added/configured so that the data added by the listener can be interpreted. At 1003, once all of the listeners are looped through, the request for remote content is sent from the consumer application to the producer application. At 1004, the producer receives the request, and is set up/configured to fulfill the request. At 1005, on the producer-side, the listeners that add data to the request are looped through again. At 1006, for each listener, a corresponding handler will validate whether the data added by the listener is to be processed by the producer application. At 1007, if data added by a listener is not valid, a "validation error response" is created. The "validation error response" is sent from the producer to the consumer. On the other hand, if the handlers validate that the data added by the listeners should be processed by the producer application, at 1008, the request (and the data added by the listeners) is processed by the producer application. At 1009, the data added by the listeners is looped through. At 1010, corresponding handlers will interpret the data added by each listener. At 1011, the producer application will produce content responsive to the interpretation by the handlers. At 1012, a response is transmitted from the producer application to the consumer application. The response may be a "validation error response" from 1007, or the produced content of 1011. At 1013, the produced content responsive to each listener is received by the consumer application. The produced content responsive to each listener may be processed by corresponding handlers at 1014.

Figure 11:
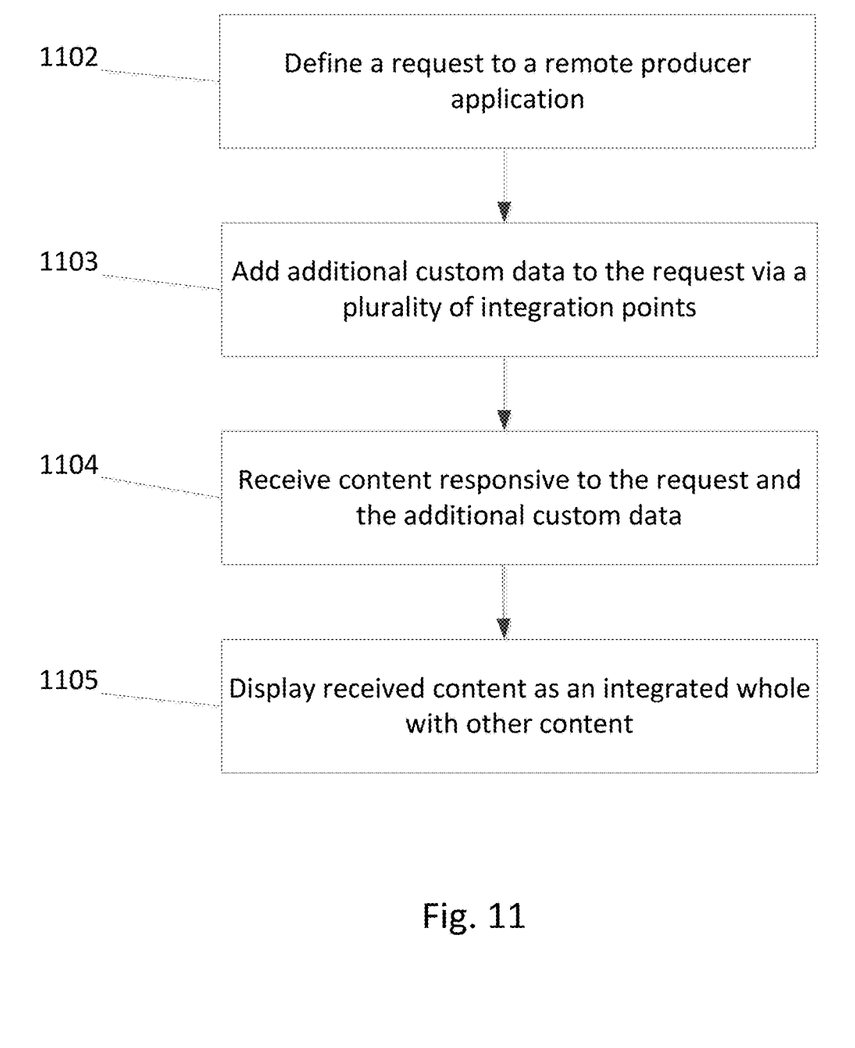
FIG. 11 is a flow diagram of the functionality of the page-generating module of FIG. 1 in accordance with one embodiment.

FIG. 11 is another flow diagram of the functionality of page-generating module 16 of FIG. 1 in accordance with one embodiment. At 1102, a request to a remote producer application is defined. In one embodiment, the request corresponds to a remote task flow. As described above, the request may originate from Region Renderer 302 of FIG. 3 of a consumer application, for example. The request may be a request for the remote producer application to produce content to be displayed by a page of the consumer application. At 1103, additional custom data is added to the request via a plurality of integration points. As described above, custom data may be added to a request via integration points corresponding to Remote Region Model 300 and/or Remote Region Listener 301, for example. At 1104, after the request and custom data are processed by the producer application, and after the producer application responds to the request with content, the content is received by the consumer application. At 1105, the content received by the consumer application is displayed as an integrated whole along with any other content that is to be displayed on the same page.

In view of the above, one embodiment is directed to a method of processing remote work flows to embed and display content from a remote producer application in a page displayed by a consumer application. The content from the remote producer application interacts with/is based upon custom data transmitted from the consumer side.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to generate a web page that integrates content from different content sources, the generating comprising:

defining a request that is transmitted from a consumer application to a remote producer application, wherein the request is for the producer application to provide content to the consumer application, the request including a task flow configured to interactively respond to contextual events sent by the consumer application to indicate a context in which the content is to be presented by the consumer application;

adding additional custom data to the request via a plurality of different integration points, wherein, the additional custom data is interpreted by a plurality of handlers that are invoked by a system hosting the consumer application and that are separate from the producer application, the handlers corresponding to the integration points, each handler includes an application programming interface for interacting with and calling into the remote producer application, and the interpreting of the additional custom data includes one or more application programming interface calls to the remote producer application;

receiving content produced by the producer application, wherein the producer application produces the content based upon the request and the additional custom data; and displaying the received content to appear as an integrated whole with other content on the web page, the received content displayed as remote content in a task flow of the web page, wherein the received content and the other content are framelessly displayed;

wherein, the producer application configures the received content to be displayed according to a stylesheet of the consumer application based on metadata included in the request and additional custom data received at the producer application, and the additional custom data invokes custom logic on the producer application.

2. The non-transitory computer readable medium of claim 1, wherein the additional custom data comprises a first contextual event and the request is further configured to be transmitted to a second remote producer application;

wherein the first contextual event invokes a second contextual event on the second remote producer application.

3. The non-transitory computer readable medium of claim 1, wherein each integration point of the plurality of integration points corresponds to a subsystem in a development framework.

4. The non-transitory computer readable medium of claim 1, wherein the additional custom data is configured to invoke custom logic on the producer application after being interpreted by the handlers, and the request and additional custom data configure the remote producer application to run application-specific logic of the consumer application.

5. The non-transitory computer readable medium of claim 1, wherein displaying the received content comprises displaying content using JavaServer Faces.

6. The non-transitory computer readable medium of claim 1, wherein the consumer application is part of a technology stack that comprises a plurality of layers, and the additional custom data is added by a layer of the technology stack that is different than a layer that corresponds to the consumer application.

7. The non-transitory computer readable medium of claim 1, wherein a plurality of contents are received from a plurality of producer applications, and the plurality of received contents are displayed to appear as an integrated whole with the other content on the web page.

8. A method for generating a web page that integrates content from different content sources, the method comprising:

defining a request that is transmitted from a consumer application to a remote producer application, wherein the request is for the producer application to provide content to the consumer application, the request including a task flow configured to interactively respond to contextual events sent by the consumer application to indicate a context in which the content is to be presented by the consumer application;

adding additional custom data to the request via a plurality of different integration points, wherein, the additional custom data is interpreted by a plurality of handlers that are invoked by a system hosting the consumer application and that are separate from the producer application, the handlers corresponding to the integration points, each handler includes an application programming interface for interacting with and calling into the remote producer application;

receiving content produced by the producer application, wherein the producer application produces the content based upon the request and the additional custom data; and displaying the received content to appear as an integrated whole with other content on the web page, the received content displayed as remote content in a task flow of the web page, wherein the received content and the other content are framelessly displayed;

wherein, the producer application configures the received content to be displayed according to a stylesheet of the consumer application based on metadata included in the request and additional custom data received at the producer application, and the additional custom data invokes custom logic on the producer application.

9. The method of claim 8, wherein the additional custom data comprises a first contextual event and the request is further configured to be transmitted to a second remote producer application;

wherein the first contextual event invokes a second contextual event on the second remote producer application.

10. The method of claim 8, wherein each integration point of the plurality of integration points corresponds to a subsystem in a development framework.

11. The method of claim 8, wherein the additional custom data is configured to invoke custom logic on the producer application after being interpreted by the handlers, and the request and additional custom data configure the remote producer application to run application-specific logic of the consumer application.

12. The method of claim 8, wherein displaying the received content comprises displaying content using JavaServer Faces.

13. The method of claim 8, wherein the consumer application is part of a technology stack that comprises a plurality of layers, and the additional custom data is added by a layer of the technology stack that is different than a layer that corresponds to the consumer application.

14. The method of claim 8, wherein a plurality of contents are received from a plurality of producer applications, and the plurality of received contents are displayed to appear as an integrated whole with the other content on the web page.

15. A system for generating a web page that integrates content from different content sources, the system comprising:

a processor;

a memory coupled to the processor;

a defining module that defines a request that is transmitted from a consumer application to a remote producer application, wherein the request is for the producer application to provide content to the consumer application, the request including a task flow configured to interactively respond to contextual events sent by the consumer application to indicate a context in which the content is to be presented by the consumer application;

an adding module that adds additional custom data to the request via a plurality of different integration points, wherein the additional custom data is interpreted by a plurality of handlers that are invoked by the system hosting the consumer application and that are separate from the producer application, the handlers corresponding to the integration points, each handler includes an application programming interface for interacting with and calling into the remote producer application[, and the interpreting of the additional custom data includes one or more application programming interface calls to the remote producer application];

a receiving module that receives content produced by the producer application, wherein the producer application produces the content based upon the request and the additional custom data; and a displaying module that displays the received content to appear as an integrated whole with other content on the web page, the received content displayed as remote content in a task flow of the web page, wherein the received content and the other content are framelessly displayed;

wherein, the producer application configures the received content to be displayed according to a stylesheet of the consumer application based on metadata included in the request and additional custom data received at the producer application, and the additional custom data invokes custom logic on the producer application.

16. The system of claim 15, wherein the additional custom data comprises a first contextual event and the request is further configured to be transmitted to a second remote producer application;

wherein the first contextual event invokes a second contextual event on the second remote producer application.

17. The system of claim 15, wherein each integration point of the plurality of integration points corresponds to a subsystem in a development framework.

18. The system of claim 15, wherein the additional custom data is configured to invoke custom logic on the producer application after being interpreted by the handlers, and the request and additional custom data configure the remote producer application to run application-specific logic of the consumer application.

19. The system of claim 15, wherein displaying the received content comprises displaying content using JavaServer Faces.

* * * * *

UNITED STATES PATENT AND TRADEMARK OFFICE
CERTIFICATE OF CORRECTION

PATENT NO. : 10,089,406 B2  
APPLICATION NO. : 13/753870  
DATED : October 2, 2018  
INVENTOR(S) : David Schneider et al.

Page 1 of 1

It is certified that error appears in the above-identified patent and that said Letters Patent is hereby corrected as shown below:

In the Claims

In Column 11, Lines 8-11, in Claim 1, please delete ", and the interpreting of the additional custom data includes one or more application programming interface calls to the remote producer application"

In Column 13, Lines 15-18, in Claim 15, please delete "[, and the interpreting of the additional custom data includes one or more application programming interface calls to the remote producer application]"

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*